Feb. 24, 1970    KAZUMARO FURUSE ET AL    3,496,938
CONTRACEPTIVE MEMBRANES AND PREPARATION THEREOF
Filed Aug. 17, 1967
Elastic Membrane
Containing Spermatocide
INVENTORS
Kazumaro Furuse
Noboru Naruse
Kuniyuki Nakamura
BY Wenderoth, Lind & Ponack
ATTORNEYS

United States Patent Office 3,496,938
Patented Feb. 24, 1970

3,496,938
CONTRACEPTIVE MEMBRANES AND
PREPARATION THEREOF
Kazumaro Furuse and Noboru Naruse, Tokyo, and
Kuniyuki Nakamura, Osaka, Japan, assignors, by
mesne assignments, to Eisai Kabushiki Kaisha,
Tokyo, Japan
Filed Aug. 17, 1967, Ser. No. 661,264
Claims priority, application Japan, Aug. 18, 1966,
41/53,923; July 6, 1967, 42/43,060
Int. Cl. A61f 5/42, 5/46
U.S. Cl. 128—271                                    9 Claims

ABSTRACT OF THE DISCLOSURE

The present invention relates to the shaped contraceptive artificial membranes or skins for male which are stretchable and easily dispersible and spreadable in vagina when used, and to a process for the preparation thereof from an aqueous spermatocidal composition essentially consisting of gelatine, a polyalcohol and water along with a spermatocidal agent, and in addition one or more of the auxiliary additives selected from the group consisting of polyvinyl pyrrolidone, polyvinyl alcohol, a polyoxyethylene-polyoxypropylene block copolymer and any other surfactant possessing or not possessing spermatocidal activity.

---

The present invention relates to the contraceptive artificial membranes or skins for male having a shape similar to but shorter than the conventional sheaths or condoms and to a process for the preparation thereof.

Hitherto, sheaths or condoms for males as well as contraceptive preparations for females have been used for the purpose of contraception. Sheaths or condoms have, however, a disadvantage as they feel unpleasant when used, and in addition, there is a certain trouble to dispose the spent ones. Besides, pin holes occasionally occur on the sheath or condom and make the latter impossible to execute a reliable contraception. In the use of the known contraceptive preparations in a form of gelatinous globules or suppositories to be used for females, on the other hand, there is a difficulty of requiring an auxiliary appliance; or else, it requires a skilled finger-operation in order to take it to position in the depth of the vagina; otherwise, it will flow out the opening of the vagina.

All of the abovementioned difficulties may be removed by using the contraceptive artificial membranes according to the present invention. A reliable contraception is thus attained by simply putting the shaped membrane over the glans penis when used. Thus, the membrane when carried to the bottom of the vagina will rapidly swell out with absorption of the secreted liquor of the vagina at the body temperature to collapse itself into a dispersed fluid capable of spreading around the interior of the vagina. The figure in the drawing represents the membrane.

In the broad aspect, the process of the present invention comprises (1) preparing an aqueous composition by admixing 10–35% of gelatine, 15–35% of a polyalcohol, 30–65% of water along with a spermatocidally effective amount of a spermatocide, and in addition, from 1.0% or less to 20% or more of one or more of the auxiliary additives selected from the group consisting of polyvinyl pyrrolidone, polyvinyl alcohol, a polyoxyethylene-polyoxypropylene block copolymer such as Pluronic and Tetronic (the commercial names) available in market, and any other surfactant advantageously having a spermatocidal activity and 30–65% of water along with spermatocidal agent, all of the percents (%) being by weight; (2) heating gently with stirring the aqueous composition thus obtained to form a homogeneous fluid and (3) forming the shaped membranes from the fluid by means of a conventional process for the production of the known sheaths. It is to be noted that the addition of the spermatocidal agent to the above composition may be omitted, when a surfactant having a sufficient spermatocidal activity is used as the auxiliary additives.

It has been found that 10–35% of the gelatine content in the aforementioned aqueous compositions are most preferable; with a lesser content of the gelatine, an aqueous composition is obtained having a tendency of producing the membranes of good swelling and dispersing properties but easily breakable, owing to their deficient expanding and stretching properties; while with a larger content of the gelatine, an aqueous composition is obtained which will produce the hard membranes difficult to swell.

It has further been found that 15–35% of the polyalcohol content in the aqueous composition, on the other hand, are effective to maintain the desired moisture content as well as the glaze of the finished membranes; with a lesser amount of the polyalcohol, an aqueous composition thus obtained will produce the membranes having mutable qualities that are changeable during the storage, owing to an excess loss by evaporation of the moisture content desired for the membranes, while with an aqueous composition which contains a larger amount of the polyalcohol, the swelling and dissolving velocities of the gelatine in the step of the preparation of the aqueous fluid composition are hindered.

It has still further been found that 1.0% or less to 20% or more of one or more of the auxiliary additives such as aforementioned is preferable in order to obtain the aqueous composition capable of forming strong and thus stretchable membranes of the present invention. It has also been found that these compounds, owing to their remarkable hydrophylic and softening properties, will facilitate the swelling, dispersing and spreading abilities of the thus obtained membranes in vagina.

Finally, it has been found that addition of a small amount of di-octyl sodium sulfosuccinate to the composition will promote the dissolution and penetration of the membranes thus obtained in the interior of the vagina.

The excellent elongation and dispersing properties presented by the membranes of the present invention will be understood from the observation which has been conducted in accordance with the methods disclosed in the hereinafter given Example 1 with the membranes prepared from the following typical compositions according to the process mentioned in said Example 1.

| Compositions | (a) | (b) | (c) | (d) | (e) |
|---|---|---|---|---|---|
| Gelatine (parts by weight) | 20 | 20 | 20 | 20 | 20 |
| Glycerol | 25 | 25 | 25 | 25 | 25 |
| Auxiliary additive: | | | | | |
| p-Menthanyl polyoxyethylene ether | 10 | | | | |
| Benzalconium chloride | | | 10 | | |
| Nonylphenyl-oxynylethylene ether | | | | 10 | |
| Sodium dodecylsulfonate | | | | | 10 |
| Water | 55 | 45 | 45 | 45 | 45 |
| (a) Elongation: | | | | | |
| Duration of storage (days) | 1 | 2 | 3 | 4 | 5 |
| Elongation (percent): | | | | | |
| Membrane (a) | 280 | 250 | 240 | 220 | 180 |
| Membrane (b) | 310 | 320 | 310 | 310 | 300 |
| Membrane (c) | 260 | 290 | 310 | 320 | 340 |
| Membrane (d) | 250 | 310 | 320 | 340 | 330 |
| Membrane (e) | 230 | 260 | 300 | 300 | 280 |
| (b) Dispersibility (dissolution velocity): | | | | | |
| Duration of storage (days) | 1 | 2 | 3 | 4 | 5 |
| Time in seconds required for complete dissolution: | | | | | |
| Membrane (a) | 60 | 85 | 80 | 90 | 110 |
| Membrane (b) | 30 | 40 | 35 | 35 | 35 |
| Membrane (c) | 60 | 60 | 50 | 50 | 55 |
| Membrane (d) | 30 | 40 | 45 | 50 | 65 |
| Membrane (e) | 60 | 60 | 50 | 50 | 50 |

Suitable polyalcohols to be used for the preparation of the composition of the present invention include ethylene glycol, ethylene chlorohydrine, polyethylene glycol, glycerol and the like, and glycerol is found most preferable for this purpose among others.

It has further been found that spermatocides suitable for the preparation of the membranes of the present invention include all of the known active compounds usually employed in this field, such as, for example, p-menthanyl polyethylene, preferably of those having 8–9 polyethylene moieties (n), mercury phenylacetate, 8-oxyquinoline and the like. A special advantage is obtained by utilizing the surfactants as the auxiliary component that possess in addition to their stretching and dispersing effects a spermatocidal activity.

Suitable surfactants which also possess spermatocidal activity include p-menthanyl phenylpolyoxyethylene ether, nonyl phenylpolyoxynylethylene ether, octyl cresolpolyoxyethylene ether, polyoxyethylene oxypropylene stearate, polyoxyethylene laurate, glycerol ricinolate, di-iso-butyl phenylpolyoxyethylene ether, tri-isopropyl phenylpolyoxyethylene ether, mono-iso-octyl phenyl ether polyethylene glycol, polyoxyethylene stearylamine, benzalconium chloride, cetyl trimethylammonium bromide, methyl benzetonium chloride, benzetonium chloride, methyl dodecylxylyrene-bis-trimethylammonium chloride, sodium dodecylsulfate, di-2-ethylhexyl sodium sulfosuccinate, nonylphenolpolyethylene sodium sulfate, sodium oleate, zinc phenolsulfonate, dodecylbenzen sulfonate, dodecyl di-aminoethyl-glycine and the like.

Owing to their broader surface areas as compared with those of the known suppository for female, the shaped membranes of the present invention possess a considerably rapid swelling and dispersing properties when they meet water at the temperature around 37° C. The membranes are susceptible of a quick dissolution in vagina and distributable around the interior thereof. They therefore display an outstanding spermatocidal effect that cannot be expected by the known contraceptive suppository. It is further notable that the membranes of the present invention are stable when stored in an atmosphere at the ordinary temperature and ordinary relative humidity.

The following examples will serve to illustrate more fully this invention:

EXAMPLE 1

A composition totally weighing 75 grs. was prepared by mixing the following ingredients:

| | Grs. |
|---|---|
| p-Menthanyl phenylpolyoxyethylene (n equals 9) | 5.8 |
| Gelatine | 20 |
| Glycerol | 19 |
| Polyvinylpyrrolidone | 1.5 |
| Methyl p-hydroxybenzoate | 0.09 |
| Propyl p-hydroxybenzoate | 0.02 |
| Distilled water, sufficient to make up the total | 75 |

The composition was heated gently to 75°–80° C. with thoroughly stirring until a homogeneous fluid was obtained. At that temperature, a set of 48 metallic pieces in proper shape and 36 mm. diameter was dipped into the fluid, held for a few seconds and then drawn out. Layer of the fluid composition covering each end of the pieces was dried to harden for about 30 minutes with exposure to a stream of dry air at room temperature to obtain the shaped tender membranes containing about 18–65% moisture. Each of the membranes possessed approximate $500\mu$ thickness and weighed about 1.2 grs.

Elongation, dispersibility in water and spermatocidal activity of the membranes thus obtained were measured as follows:

(1) Elongation

To the test pieces of the membranes having $500\mu$ thickness, 10 mm. width and 100 mm. length suspended horizontally were respectively applied 500 grs. load. The pieces had broken down at 3000–3800 elongations. The average elongation factor is therefore 3–4 which is comparable to that of a conventional sheath having a similar thickness made of a rubbery sheet of elastomer even though the restoration tendency to the original length of the elongated pieces is somewhat inferior to that of the rubbery sheath. The shaped membranes having a given size according to the present invention are applicable to everybody of the male.

(2) Dispersibility in water

The test pieces same as those used in the preceding elongation test were dipped into 10 ml. of water at the various temperatures. The times required for the complete dissolution were observed. The results obtained are as follows:

| Temperature (° C.): | Time (sec.) required for complete dissolution |
|---|---|
| 25 | 360–510 |
| 30 | 100–150 |
| 37 | 30–70 |
| 40 | 25–50 |

It is presumed that at most 2–3 ml. of the secreted liquor are normally held in vagina, although there are certain variations between individual female.

Same membranes as those used in the preceding test were dipped into the varied quantities of water at 37° C. The results obtained are listed:

| Quantities of water (ml.): | Time (sec.) required for complete dissolution |
|---|---|
| 1 | 230–370 |
| 2 | 120–150 |
| 3 | 65–120 |
| 4 | 40–90 |
| 5 | 30–70 |
| 6 | 30–70 |
| 7 | 30–70 |
| 8 | 30–70 |

It is therefore concluded that about 65–150 seconds of the duration of time would be necessary in order to secure a complete dissolution of the membrane in vagina when used.

Apart from the above, a comparative weathering test was carried out with respect to the effect of the different storing periods on the dispersibility in water of the membranes (a) obtained in the above Example 1 and of the hitherto known membranes (b) prepared from an aqueous composition consisting of gelatine and a polyalcohol.

The test pieces each having $500\mu$ thickness, 50 mm. length and 30 mm. width were respectively wrapped in foils of metallic aluminium and held in a humidstat at $35° \pm 0.2°$ C. and a $90 \pm 2\%$ relative humidity for five days. During the storage, some of the pieces were picked up day by day, and the bared membranes were then dipped into water at $37°$ C. $\pm 0.2°$ C. kept in a thermostat and held therein without stirring. The results obtained are as follows:

| Weathering time (days) | 1 | 5 | 10 | 15 | 20 |
|---|---|---|---|---|---|
| Time (sec.) required for complete dissolution of membranes (a) | 50 | 60 | 55 | 60 | 65 |
| Time (sec.) required for complete dissolution of membranes (b) | 250 | 255 | 270 | 280 | 300 |

| Weathering time (days) | 25 | 30 | 35 | 40 | |
|---|---|---|---|---|---|
| Time (sec.) required for complete dissolution of membranes (a) | 70 | 75 | 70 | 70 | |
| Time (sec.) required for complete dissolution of membranes (b) | 295 | 300 | 305 | 310 | |

From the above, it will be seen that no appreciable injurious effect was caused on the dissolution time of the membranes of the present invention even at the storage under the severe condition with respect to the humidity.

(3) Spermatocidal activity

Each 1.2 grs. of fresh membranes of the present invention, containing 928 mgs. of p-menthanyl polyoxyethylene (n equals 9) were dissolved into physiological saline water (solutio natrii chloridi isotonica) to obtain a series of the six dispersions in 5–50 old dilutions. The spermatocidal activity of the respective dispersion on human spermatozoa was determined in accordance with the modified Gamble's method authorized by the Japanese Government. The times (sec.) required for obtaining a complete spermatocidal effect of the diluted dispersions thus obtained are listed:

| Dilutions: | Times (sec.) |
|---|---|
| ×5 | 0 |
| ×10 | 0 |
| ×20 | 0 |
| ×30 | 0 |
| ×40 | 0 |
| ×50 | <300 |

As will be seen from the above, the 40-fold dilution is still enough to completely kill the spermatozoa and the fact proves the usefulness of the membranes of the present invention in vivo.

EXAMPLE 2

75 grs. of an aqueous composition were prepared by mixing the following ingredients according to the preceding example.

| | Grs. |
|---|---|
| Mercury phenylacetate | 0.055 |
| Gelatine | 20 |
| Glycerol | 19 |
| Polyvinyl alcohol | 1.5 |
| Methyl p-hydroxybenzoate | 0.09 |
| Propyl p-hydroxybenzoate | 0.02 |
| Distilled water sufficient to make up the total 75. | |

A set of the membranes having excellent elongation, dispersibility and spermatocidal effect was thus obtained.

EXAMPLE 3

75 grs. of an aqueous composition were prepared by mixing the following ingredients:

| | Grs. |
|---|---|
| p-Menthanlyphenylpolyoxyethylene (n equals 9) | 5.8 |
| Gelatine | 20 |
| Glycerol | 20 |
| Pluronic | 4 |
| Methyl p-hydroxybenzoate | 0.09 |
| Propyl p-hydroxybenzoate | 0.02 |
| Distilled water sufficient to make up the total 75. | |

A set of the shaped membranes having the excellent qualities was obtained from the composition in accordance with the preceding examples.

EXAMPLE 4

75 grs. of a composition were prepared by mixing the following ingredients:

| | Grs. |
|---|---|
| p-Menthanylphenylpolyoxyethylene (n equals 9) | 5.8 |
| Gelatine | 20 |
| Glycerol | 19 |
| Polyvinyl pyrrolidone (K–30) | 1.5 |
| Methyl p-hydroxybenzoate | 0.09 |
| Propyl p-hydroxybenzoate | 0.02 |
| Distilled water sufficient to make up the total 75. | |

From the composition, 48 membranes having 500µ thickness and each weighed 1.2 grs. were obtained in accordance with the preceding examples.

EXAMPLE 5

100 grs. of an aqueous composition were prepared by mixing the following ingredients in accordance with the preceding example.

| | Grs. |
|---|---|
| Nonylphenyl polyethylene ether | 5 |
| Gelatine | 24 |
| Glycerol | 20 |
| Methyl p-hydroxybenzoate | 0.09 |
| Propyl p-hydroxybenzoate | 0.02 |
| Distilled water sufficient to make up the total 100. | |

The composition was heated to 75°–80° C. with thoroughly stirring to melt and the melt was cooled to 55°–60° C. A sheet having 500µ thickness was prepared with the homogeneous fluid composition by passing it through rolls. The sheets were cut off to strips of 15 mm. width and 200 mm. length.

EXAMPLE 6

100 grs. of an aqueous composition were prepared by mixing the following ingredients in accordance with the preceding examples.

| | Grs. |
|---|---|
| Benzalconum chloride | 0.1 |
| Gelatine | 23.5 |
| Glycerol | 21.0 |
| Polyvinyl pyrrolidone | 1.8 |
| Methyl p-hydroxybenzoate | 0.1 |
| Propyl p-hydroxybenzoate | 0.05 |
| Distilled water sufficient to make up the total 100. | |

The aqueous composition was heated to 75°–80° C. with thoroughly stirring to melt. The melt was cooled at 55°–60° C. and passed through the rolls to obtain a sheet of 500µ thickness. Concaved membranes having a desired shape were made by stamping out the sheet through a metallic die.

EXAMPLE 7

A fluid composition was prepared by mixing under heat the following ingredients:

| | Grs. |
|---|---|
| Oxyquinoline sulphate | 1.0 |
| Methylbenzetonium chloride | 0.2 |
| Gelatine | 25.0 |
| Glycerol | 23.0 |
| Methyl p-hydroxybenzoate | 0.1 |
| Propyl p-hydroxybenzoate | 0.05 |
| Distilled water sufficient to make up the total 100. | |

Membranes were prepared from the composition in accordance with the teachings of Example 1.

EXAMPLE 8

A fluid composition was prepared by mixing under heat the following ingredients:

| | Grs. |
|---|---|
| Polyoxyethylene oxypropylene stearate | 2.5 |
| Gelatine | 26.0 |
| Glycerol | 20.0 |
| Polyvinyl pyrrolidone | 1.8 |
| Methyl p-hydroxybenzoate | 0.1 |
| Propyl p-hydroxybenzoate | 0.05 |
| Distilled water sufficient to make up the total 100. | |

Membranes were prepared from the fluid composition in accordance with the teachings of Example 1.

EXAMPLE 9

100 grs. of a fluid composition were prepared by mixing the following ingredients in accordance with the preceding examples.

| | Grs. |
|---|---|
| Sodium dodecyl-sulphate | 1.0 |
| Gelatine | 19.5 |
| Glycerol | 20.5 |
| Polyvinyl pyrrolidone | 1.5 |
| Methyl p-hydroxybenzoate | 0.1 |
| Propyl p-hydroxybenzoate | 0.05 |
| Distilled water sufficient to make up the total 100. | |

Membranes were prepared from the composition in accordance with same procedure as mentioned in Example 1.

EXAMPLE 10

100 grs. of a fluid composition were prepared by mixing the following ingredients in accordance with the preceding examples.

| | Grs. |
|---|---|
| Di-2-ethylhexylsodium sulfosuccinate | 0.5 |
| Gelatine | 23.0 |
| Glycerol | 25.0 |
| Polyvinyl alcohol | 2.0 |
| Methyl p-hydroxybenzoate | 0.1 |
| Propyl p-hydroxybenzoate | 0.05 |

Distilled water sufficient to make up the total 100.

Membranes were prepared from the composition in accordance with the procedure same as that disclosure of Example 1.

EXAMPLE 11

100 grs. of a fluid composition were prepared by mixing the following ingredients in accordance with the preceding examples.

| | Grs. |
|---|---|
| Polyoxyethylene (n=9) laurate | 5.0 |
| Gelatine | 23.0 |
| Glycerol | 23.0 |
| Methyl p-hydroxybenzoate | 0.1 |
| Propyl p-hydroxybenzoate | 0.05 |

Distilled water sufficient to make up the total 100.

Membranes were prepared from the composition in accordance with same procedure as mentioned in Example 1.

EXAMPLE 12

100 grs. of a fluid composition were prepared by mixing the following ingredients in accordance with the preceding examples.

| | Grs. |
|---|---|
| Glycerine ricinolate | 0.5 |
| Gelatine | 26.0 |
| Glycerol | 26.5 |
| Polyvinyl pyrrolidone | 1.8 |
| Methyl p-hydroxybenzoate | 0.1 |
| Propyl p-hydroxybenzoate | 0.05 |

Distilled water sufficient to make up the total 100.

Membranes were prepared from the composition in accordance with the same procedure as mentioned in Example 1.

EXAMPLE 13

100 grs. of a fluid composition were prepared by mixing the following ingredients in accordance with the preceding examples.

| | Grs. |
|---|---|
| Di-isobutyl phenylpolyoxyethylene ether | 1.0 |
| Gelatine | 22.5 |
| Glycerol | 17.0 |
| Methyl p-hydroxybenzoate | 0.1 |
| Propyl p-hydroxybenzoate | 0.05 |

Distilled water sufficient to make up the total 100.

Membranes were prepared from the fluid composition in accordance with same procedure as mentioned in Example 1.

EXAMPLE 14

100 grs. of a fluid composition were prepared by mixing the following ingredients in accordance with the preceding examples.

| | Grs. |
|---|---|
| Mercury phenylacetate | 0.055 |
| Polyoxyethylene laurate | 1.3 |
| Gelatine | 23.5 |
| Glycerol | 20.0 |
| Methyl p-hydroxybenzoate | 0.1 |
| Propyl p-hydroxybenzoate | 0.05 |

Distilled water sufficient to make up the total 100.

Membranes were prepared from the composition in accordance with same procedure as mentioned in Example 1.

What is claimed:

1. A method for the preparation of spermatocidal elastic membranes dispersible in water at about 37° C., which comprises preparing an aqueous composition by mixing 10–35% by weight of gelatine, 15–35% by weight of polyalcohol, 15–65% by weight of water, a spermatocidally effective quantity of spermatocidal agent and an effective amount of one or more auxiliary additives selected from the group consisting of polyvinyl pyrrolidone, polyvinyl alcohol and polyoxyethylene - polyoxypropylene block copolymer; heating the aqueous composition to form a homogeneous fluid and forming the membranes from the hot fluid.

2. A method according to claim 1, wherein said spermatocidal agent possess surfactant properties.

3. A method according to claim 1, wherein said aqueous composition also comprises a non-spermatocidal but surfactantly-effective amount of surfactant.

4. A spermatocidal composition, dispersible in water at a body temperature, comprising 10–35% by weight of gelatine, 15–35% by weight of a polyalcohol, 15–45% by weight of water, a spermatocidally effective quantity of spermatocidal agent and an effective amount of one or more auxiliary additives selected from the group consisting of polyvinyl pyrrolidone, polyvinyl alcohol, and polyoxyethylene-polyoxypropylene block copolymers.

5. A spermatocidal composition according to claim 4, wherein said spermatocidal agent possesses surfactant properties.

6. A spermatocidal composition according to claim 4, wherein said composition also comprises a non-spermatocidal but surfactantly-effective amount of surfactant.

7. Shaped elastic sprematocidal membrane consisting essentially of a spermatocidal composition, dispersible in water at a body temperature, comprising 10–35% by weight of gelatine, 15–35% by weight of a polyalcohol, 15–45% by weight of water, a spermatocidally effective quantity of spermatocidal agent and an effective amount of one or more auxiliary additives selected from the group consisting of polyvinyl pyrrolidone, polyvinyl alcohol, and polyoxyethylene-polyoxypropylene block copolymers.

8. Shaped elastic spermatocidal membrane consisting essentially of a spermatocidal composition according to claim 4, wherein said spermatocidal agent possesses surfactant properties.

9. Shaped elastic spermatocidal membrane consisting essentially of a spermatocidal composition according to claim 4, wherein said composition also comprises a non-spermatocidal but surfactantly-effective amount of surfactant.

References Cited

UNITED STATES PATENTS

| 2,696,456 | 12/1954 | Hetterick | 128—271 |
|---|---|---|---|
| 2,918,404 | 12/1959 | Mende et al. | 424—331 |
| 3,342,181 | 9/1967 | Jacquignon | 128—271 |
| 3,373,746 | 3/1968 | White et al. | 128—271 |

ADELE M. EAGER, Primary Examiner

U.S. Cl. X.R.

128—127; 424—331